United States Patent [19]
Fricker et al.

[11] Patent Number: 6,059,324
[45] Date of Patent: May 9, 2000

[54] PIPE CONNECTION COUPLING, ESPECIALLY FOR CONNECTING A PIPE ON A MOTOR VEHICLE HEAT EXCHANGER

[75] Inventors: Thomas Fricker; Prasanta Halder, both of Ditzingen; Wolfgang Kniele, Filderstadt, all of Germany

[73] Assignee: Behr GmbH & Co., Germany

[21] Appl. No.: 09/131,781

[22] Filed: Aug. 10, 1998

[30] Foreign Application Priority Data

Aug. 29, 1997 [DE] Germany .............. 197 37 704

[51] Int. Cl.$^7$ ........................................... F16L 37/14
[52] U.S. Cl. ................................. 285/305; 285/309
[58] Field of Search ........................ 285/305, 309

[56] References Cited

U.S. PATENT DOCUMENTS

| | | |
|---|---|---|
| 3,154,327 | 10/1964 | Rothschild . |
| 3,822,074 | 7/1974 | Welcker ................................ 285/305 |
| 4,281,860 | 8/1981 | Streit ................................. 285/305 X |
| 5,000,614 | 3/1991 | Walker et al. ..................... 285/305 X |
| 5,016,922 | 5/1991 | Mer et al. ......................... 285/305 X |

FOREIGN PATENT DOCUMENTS

| | | |
|---|---|---|
| 2 101 978 | of 1972 | Germany . |
| 31 26 405 A1 | of 1983 | Germany . |
| 35 17 488 A1 | of 1986 | Germany . |
| 3601898 | 3/1987 | Germany ............................ 285/305 |
| 196 21 283 A1 | of 1997 | Germany . |

*Primary Examiner*—Dave W. Arola
*Attorney, Agent, or Firm*—Evenson, McKeown, Edwards & Lenahan P.L.L.C.

[57] ABSTRACT

A coupling element connects a connection piece with an insertable end of a connection tube having a toroidal flange for contacting the connection piece in the tube inserting direction. A plug-in fork can be inserted into the coupling element to releasably secure the inserted tube end area against the tube inserting direction, with the tube torus held in place by the plug-in fork. For this purpose, pairs of plug-through openings are provided on side walls of the connection piece opposite one another, so that one prong of the plug-in fork can be inserted into each opening. Inserting bevels are assigned to at least a portion of the plug-through openings, which inserting bevels are shaped such that they cause a forced movement of the plug in fork in the tube inserting direction during its insertion in the plug-in fork inserting direction.

10 Claims, 2 Drawing Sheets

PIPE CONNECTION COUPLING, ESPECIALLY FOR CONNECTING A PIPE ON A MOTOR VEHICLE HEAT EXCHANGER

BACKGROUND AND SUMMARY OF THE INVENTION

This application claims the priority of 197 37 704.1, filed Aug. 29, 1997, the disclosure of which is expressly incorporated by reference herein.

The invention relates to a tube connection coupling of the type having a connection piece for receiving the end of a tube that can be inserted in the axial direction of the connection piece, and is provided with a toroidal member or flange which is to be supported on the connection piece in the inserting direction of the tube. A releasably inserted plug-in fork bears against the toroidal member, securing the end of the inserted tube against movement in a direction opposite the inserting direction of the tube. For this purpose, the connection piece has pairs of plug-through openings on opposing side walls thereof, through which respective prongs of the plug-in fork can be inserted.

A connection coupling of this type is disclosed in German Patent Document DE 35 17 488 C2 for connecting a tube to a radiator tank of a motor vehicle heat exchanger. There, the passage openings on the side walls of the connection pieces for receiving the plug-in fork consist of one pair respectively of oblong holes which are situated opposite one another in the insertion direction of the plug-in fork and which, measured in the tube inserting direction, are situated at the same height and extend in a straight line with a longitudinal oblong hole axis, transversely to the inserting direction of the tube and to the inserting direction of the plug-in fork. For mounting, the tube must first be pressed completely into the connection piece, preferably while inserting a sealing ring, and must then be held in this position until it is secured against outward movement, by inserting the plug-in fork.

In another tube connection coupling of this type, described in German Patent Document No. 196 21 283.9, the connection piece has at least one plug-in fork guide tab between a pair of plug-through openings for a respective plug-in fork prong, which plug-in fork guide tab bounds the plug-in fork inserting movement in the axial direction of the connection piece. The plug-in fork guide tabs prevent jamming of the plug-in fork in the axial direction of the connection piece during insertion, and ensure that, after being inserted through the plug-through openings in one connection piece side wall, the prongs reliably reach the opposite opening areas on the other connection piece side wall, without need of particular care in handling the plug-in fork.

One disadvantage of the above-described known couplings is that to achieve the sort of tube connection that is usually desired (that is, a connection which is under tension, is free from play and is therefore tight), the tube, to which a sealing ring is normally premounted on the tube torus, is completely inserted into the connection piece, and must be held in this position until the plug-in fork is inserted and secures the tube against outward movement. This makes the mounting and removal of the tube on the connection piece or pieces difficult, particularly where the tube connection cannot be inspected and/or is poorly accessible, and therefore requires virtually blind mounting or removal.

One object of the invention is to provide a tube connection coupling of the initially mentioned type which can be mounted and removed comparatively simply and reliably.

This and other objects and advantages are achieved by the tube connection coupling according to the invention, in which inserting bevels are assigned to at least a portion of the plug-through openings. These inserting bevels are shaped so that they cause a forcible displacement of the plug-in fork in the tube inserting direction as the plug-in fork is moved in the plug-in fork inserting direction. For mounting, therefore, the tube does not have to be inserted completely into the connection piece and held in there until the securing plug-in fork is inserted, as is necessary with prior art couplings. Rather, the tube need only be loosely inserted into the connection piece, sufficiently for the plug-in fork to be pushed in can reach around its toroidal member. Complete insertion of the plug-in fork then causes the remaining tube inserting movement, by means of which the toroidal member or flange of the tube is preferably pressed (without play) against a corresponding stop face on the connection piece, preferably by means of an inserted O-ring seal, on the one hand, and the plug-in fork on the other hand. This advantageous result is achieved by virtue of the fact that the inserting movement of the plug-in fork forcibly displaces it in the tube inserting direction by the effect of the inserting bevels, and therefore, by way of its contact on the torus, displaces the tube in the tube inserting direction.

It is understood that the shape and the arrangement of the inserting bevels are adapted to the shape of the plug-in fork in such a manner that, during the insertion, the plug-in fork is displaced in the tube inserting direction by the exact amount by which the tube, after its initial loose insertion into the connection piece, is still spaced away from its desired position in the completely mounted condition. If an O-ring seal is premounted on the tube, it is, for example, advantageous for the tube to be initially loosely inserted only to such an extent that the O-ring rests against the connection piece, without already having been pressed into it or having been pressed against it. This sealing pressing-in or pressing-on of the tube with respect to the connection piece by way of the O-ring is then carried out solely by the plug-in fork during its insertion by its forced displacement in the tube inserting direction caused by the inserting bevels.

Thus, with the coupling according to the invention, it is unnecessary to hold the connection tube during the insertion of the plug-in fork while exercising a pressure force acting in the tube inserting direction. The mounting can therefore be carried out easily and reliably, even when the position of the connection piece cannot be seen, or is poorly accessible. Removal is equally simple, in that only the plug-in fork need be unplugged, which can be accomplished by pressing the tube in the tube inserting direction as far as possible. The tube can then be removed from the connection piece.

In one embodiment of the tube connection according to the invention, two pairs of plug-through openings are provided for a two-prong plug-in fork. In this case inserting bevels are assigned at least to the plug-through openings which are in the front (in the plug-in fork inserting direction). These inserting bevels are specially shaped so that, by means of its forward area (the area of the free ends of the elastically spreadable plug-in fork prongs), the plug-in fork can be advanced unhindered from the inserting bevels into that area of the tube which is inserted into the connection piece. Thereafter, the inserting bevels will then interact with a rearward area of the plug-in fork, in which the spacing of its prongs (starting from a maximal distance, which corresponds approximately to the connection tube diameter and exists in a central plug-in fork area), is reduced in the direction of the rearward plug-in fork end. Because the plug-in fork moves with this rearward area against the inserting bevels, as desired, during the remaining inserting movement these inserting bevels cause a simultaneous displacement of the plug-in fork in the inserting direction of the tube.

In a further embodiment of the invention, the inserting bevels extend by means of a forward stopping surface, against which the plug-in fork moves, in the tube inserting direction in addition with at least one component included with respect to the plug-in inserting direction. That is, the pertaining surface normal vector is inclined relative to the plug-in fork inserting direction. This facilitates displacement of the plug-in fork in the tube inserting direction when it is inserted in the plug-in fork inserting direction. In the process, the inclined stop surface converts a portion of the plug-in fork inserting force (exerted in the inserting direction of the plug-in fork) into the required force pressing in the tube inserting direction.

In another embodiment of the tube connection coupling according to the invention, insertion aids are assigned to the forward plug-through openings. These are designed and arranged such that the plug-in fork is automatically inserted, by means of its free prong ends, into the area of the plug-through openings which is in the front in the tube inserting direction. This assures that the plug-in fork reliably reaches the desired position in which it extends behind the tube torus, without having to locate this position by probing with the plug-in fork. Simultaneously, the insertion aids may also operate as unplugging aids in that, during unplugging of the plug-in fork, they also press the plug-in fork in the tube unplugging direction, thereby freeing it of the contact pressure of the tube torus which facilitates the remaining pulling-out of the plug-in fork.

In yet another embodiment, the rearward plug-through openings are also provided with inserting bevels. For this purpose, the edges of these openings are correspondingly inclined in their area situated in the tube unplugging direction; that is, they extend in the plug-in fork direction, with a component which points in the tube inserting direction. During the plugging-in, as soon as it has reached the rearward plug-through openings with its free prong ends, the plug-in fork is pressed at the level of the forward and rearward plug-through openings, uniformly in the tube inserting direction. In this case, the inserting bevels of the forward and the rearward plug-through openings are designed and mutually coordinated so that, during insertion of the plug-in fork, they substantially simultaneously start to displace the plug-in fork in the inserting direction of the tube, and furthermore that upon further insertion, the plug-in fork is displaced in the tube inserting direction by all inserting bevels at essentially the same rate.

Other objects, advantages and novel features of the present invention will become apparent from the following detailed description of the invention when considered in conjunction with the accompanying drawings.

DETAILED DESCRIPTION OF THE DRAWINGS

Figure 1:
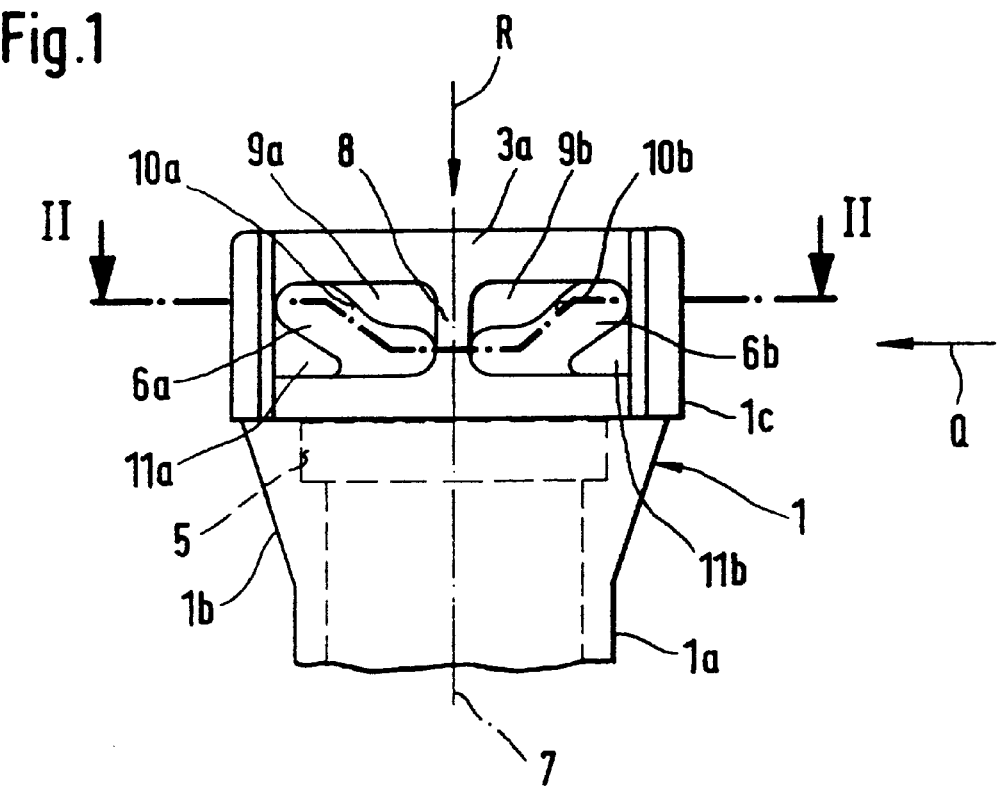
FIG. 1 is a lateral view of a connection piece of a tube connection coupling.
Figure 2:
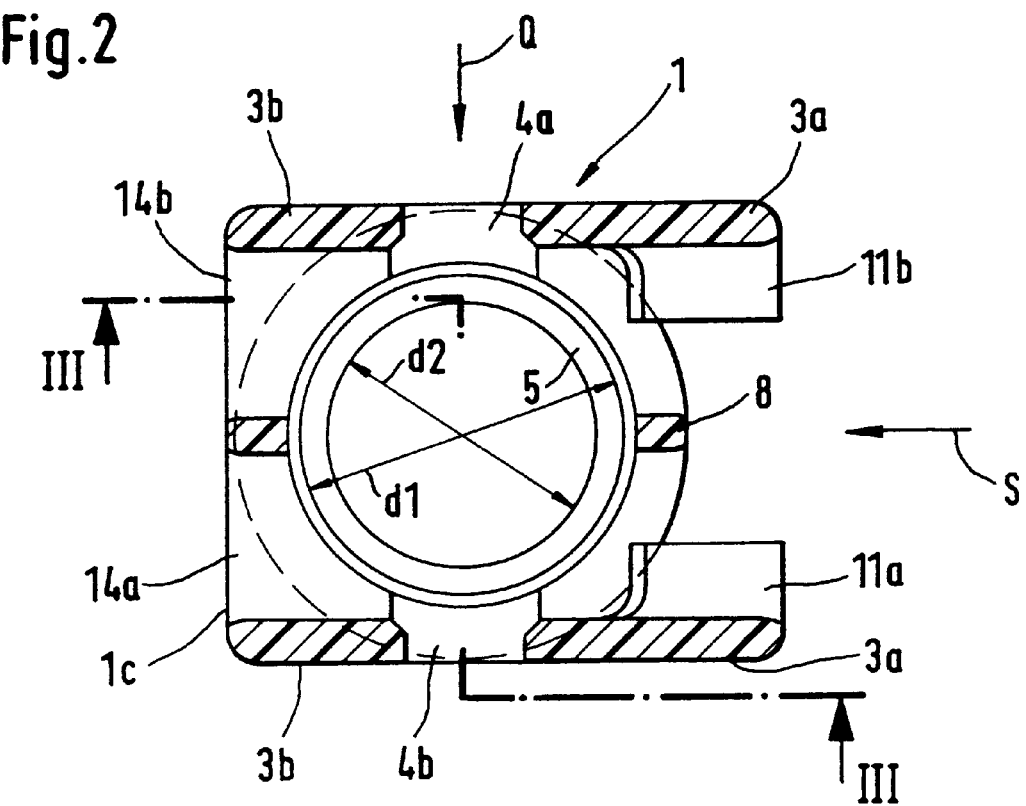
FIG. 2 is a sectional view along Line II—II of FIG. 1, rotated by 90° bout its longitudinal axis.
Figure 3:
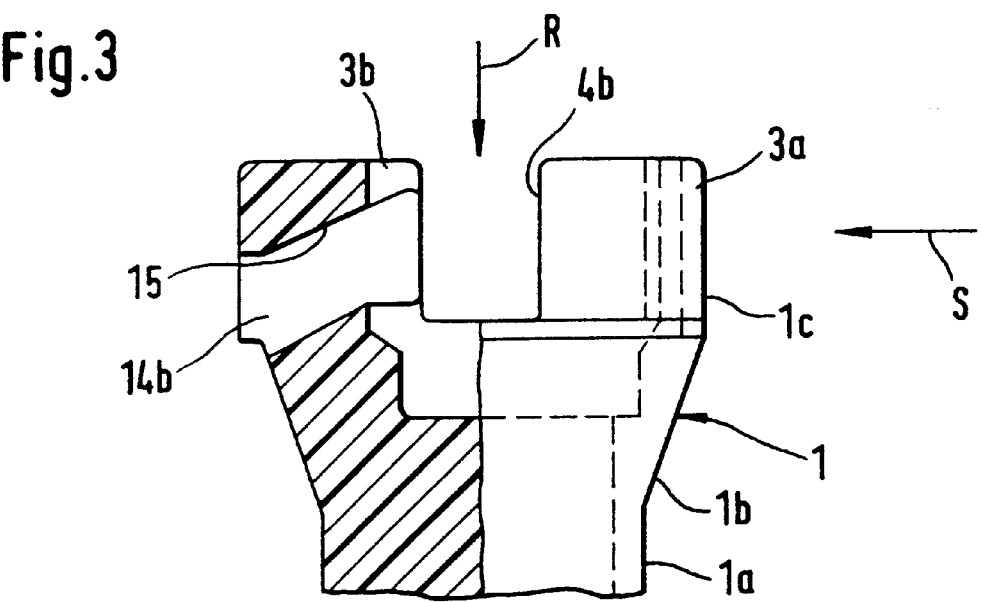
FIG. 3 is a sectional view along Line III—III of FIG. 2.
Figure 4:
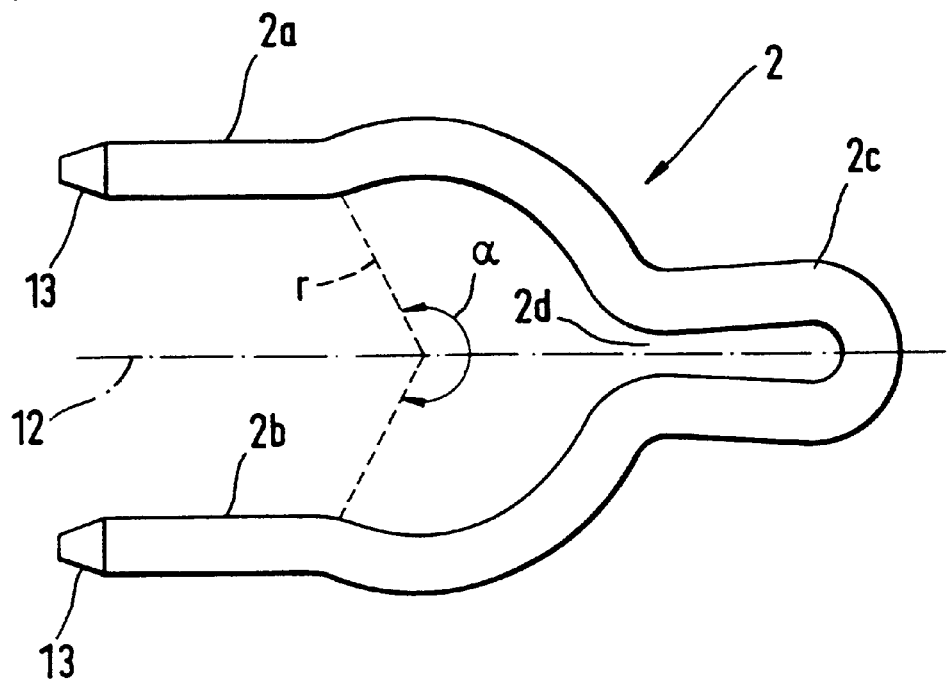
FIG. 4 is a top view of a plug-in fork which can be used for the connection piece of FIGS. 1 to 3.

FIGS. 1 to 3 illustrate a connection piece 1 of a tube connection coupling by means of which a tube (not shown), and a component such as a radiator tank of a motor vehicle heat exchanger (also not shown), which is provided with the connection piece 1, can be connected (plugged together), and secured by the two-prong plug-in fork 2 illustrated in FIG. 4. The connection piece 1 is constructed as a molded plastic part, and transitions from a segment 1a which has a uniform circular cross-section, via a conically expanding transition area 1b (also of a circular cross-section), to an end area 1c of a square cross-section which is disposed on the latter. The end area 1c contains two connection piece side walls 3a, 3b which are situated opposite one another, are spaced apart in the illustrated plug-in fork inserting direction S, and are separated from one another by two wide slots 4a, 4b.

The connection piece 1 has an overall hollow construction. At approximately at half the height of the conical transition area 1b, its interior changes from a larger circular inside diameter d1, (in the half of the transition area 1b facing the end area 1c), into an adjoining area of a smaller inside diameter d2. This forms a seat 5 in the interior of the transition area 1b for an O-shaped sealing ring to be inserted and a toroidal flange which is provided on the outer circumference of the end area of the tube that is to be inserted and connected, as illustrated in the above-mentioned German Patent Document DE 35 17 488 C2 and in the above-mentioned German Patent Document No. 196 21 283.9. This means that the larger inside diameter of the connection piece d1 corresponds approximately to the outside diameter of the O-ring.

In contrast, the toroidal flange which projects radially about the end area of the tube to be connected, has a slightly larger diameter than the inside diameter d1 of the connection piece, so that, when it is inserted into the connection piece 1 in the illustrated tube inserting direction R, the tube first comes to rest by means of the premounted O-ring, loosely against the inlet-side edge of the seat 5. That is, the O-ring is then situated approximately at the level of the boundary surface between the conical transition area 1b and the end area 1c. From this intermediate position, the tube can then be pressed farther by approximately the thickness of the O-ring into the connection piece 1, until the toroidal flange of the tube rests against the inlet-side edge of the seat 5 so that the O-ring is pressed into the seat and ensures the required sealing. In this end position, the tube is then secured against outward movement by means of the inserted plug-in fork 2.

Two passage openings 6a, 6b are provided for insertion of the two-prong plug-in fork 2. The passage openings are arranged symmetrically on both sides of a longitudinal center plane 7 of the connection piece on the connection piece side wall 3a which is forward (in the inserting direction S) of the plug-in fork. The longitudinal center plane 7, which forms a plane of symmetry of the connection piece, is defined by the inserting direction R of the tube (FIGS. 1 and 3) and the inserting direction of the plug-in fork which is perpendicular thereto. The two plug-through openings 6a, 6b are separated from one another by a central narrow separating web 8. An inserting bevel 9a, 9b, which is shaped onto the connection piece side wall 3a in the area of the tube-inlet (that is, an area situated against the tube inserting direction R and adjoining the separating web 8), is assigned there to each of the two plug-through openings 6a, 6b. The inserting bevels 9a, 9b bound the respective plug-through opening 6a, 6b in this area by means of a respective plug-in fork contact edges 10a, 10b whose bent contour is illustrated in FIG. 1. Specifically, during insertion of the plug-in fork 2, its interior prong sides slide along these two edges 10a, 10b, which extend in the direction of the central separating web 8, from a point of the plug-through opening 6a, 6b which is on the outside (relative to the longitudinal center plane 7) of the connection piece and is situated on the tube inlet side. That is, in a second transverse direction Q (FIG. 2) which is perpendicular to the plug-in fork inserting direction S, in a bent manner, with a component pointing continuously in the tube inserting direction R, joining the separating web 8 at approximately half its height. At the same time, respective surfaces of the two inserting bevels 9*a*, 9*b* which are situated toward the front (in the plug-in fork inserting direction S) and which form plug-in fork stop surfaces, extend from their tube-inlet-side corner area (that is, the upper corner area in FIG. 1 adjoining the separating web 8), in the direction of the plug-in fork contact edges 10*a*, 10*b*, with a component pointing in the plug-in fork inserting direction S. Thus, in this upper corner area in FIG. 1 adjoining the separating web 8, they close off by means of the front portion of the separating web 8 (in the plug-in fork inserting direction S), and by means of their plug-in fork contact edges 10*a*, 10*b* flush with the rearward side of the separating web.

In addition, inserting aids 11*a*, 11*b* are assigned to the two plug-through openings 6*a*, 6*b*, in their corner areas situated diagonally opposite the inserting bevels 9*a*, 9*b*. The inserting aids 11*a*, 11*b* comprise wedge shaped webs which are also shaped onto the connection piece side wall 3*a*, and extend (as illustrated in FIGS. 1 and 2), opposite the plug-in fork inserting direction S, beyond the plug-through openings 6*a*, 6*b* and the separating web 8. By virtue of the inserting bevels 9*a*, 9*b* and the inserting aids 11*a*, 11*b*, the forward plug-through openings 6*a*, 6*b* have a diagonal, oblong-hole-shaped design, with a component directed toward the connection piece longitudinal center plane 7 parallel to the second connection piece transverse direction Q, and a component which points in the tube inserting direction R, as illustrated in FIG. 1.

Corresponding to the forward plug-through openings 6*a*, 6*b*, two plug-through openings 14*a*, 14*b* are also provided in the rear side wall 3*b* (in the plug-in fork inserting direction S). As shown in greater detail in FIG. 3, these rearward plug-through openings 14*a*, 14*b* are provided as beveled openings which extend from their interior mouth edge to their exterior mouth edge, on the one hand, with a component pointing in the plug-in fork inserting direction S and, on the other hand, with a component pointing in the tube inserting direction R. At their interior end, the rearward plug-through openings 14*a*, 14*b* exit at approximately the same height at which the exterior areas of the forward plug-through openings 6*a*, 6*b* are located, which are situated on the tube inlet side. The upper half (in FIG. 3) of the oblique edge surfaces of the rearward plug-through openings 14*a*, 14*b* therefore form rearward inserting bevels 15. Each pair of plug-through openings 6*a*, 14*a*; 6*b*, 14*b* respectively, which are situated opposite each other in the plug-in fork inserting direction S, form a pair of plug-through openings into which one plug-in fork prong 2*a*, 2*b* can be inserted.

By means of this design of the forward plug-through openings 6*a*, 6*b* with the inserting bevels 9*a*, 9*b* and the inserting aids 11*a*, 11*b*, together with the rearward plug-through openings 14*a*, 14*b*, insertion of the plug-in fork 2 in the plug-in fork inserting direction S causes it to carry out a movement in the tube inserting direction R. The shape and position of the forward plug-through openings 6*a*, 6*b* with their inserting bevels 9*a*, 9*b*, and that of the rearward plug-through openings 14*a*, 14*b*, are adapted to the design of the plug-in fork 2.

The plug-in fork according to FIG. 4, which can be used as an example, is preferably shaped in one piece, such as a metal wire or as a plastic preform. As shown, the two fork prongs 2*a*, 2*b* extend from a narrow U-shaped grip part 2*c*, which is used as a handle and leaves an interior clamping gap 2*d* open, symmetrically to the plug-in fork longitudinal axis 12, along respective circular arcs with a given interior radius r, and enclose a circular segment with an angle α larger than 180°. The interior radius r corresponds approximately to the exterior radius of the tube to be inserted, so that the two fork prongs 2*a*, 2*b* can reach around the circumference of the tube, over a circular arc angle α, and thus beyond the tube radius of 180°. The elastically resilient prongs 2*a*, 2*b* of the plug-in fork 2 have a clamping effect on the inserted tube, preventing an unintentional removal (that is, movement in a direction opposite its inserting direction S). Beyond this circular-segment area, the two fork prongs 2*a*, 2*b* extend in parallel to the plug-in fork longitudinal axis 12, and their free ends terminate with a truncated-cone-shaped taper, which facilitate insertion of the fork prongs 2*a*, 2*b* in the connection piece. In addition, the resulting circumferential sloping 13 of the fork prong ends promotes snapping of the plug-in fork 2 onto the tube and prevents jamming of the plug-in fork ends during the inserting movement.

The connection piece constructed according to FIGS. 1 to 3 and the plug-in fork 2 (which for reasons of clarity is slightly enlarged with respect to FIG. 4) cooperate to provide a tube connection coupling which can be mounted in the following particularly advantageous manner. First, as described above, the O-shaped sealing ring is premounted on the toroidal flange of the tube which is to be connected, and the tube is loosely inserted into the connection piece 1 until the O-ring rests against the upper edge of the sealing ring seat 5. The height of plug-through openings 6*a*, 6*b*, 14*a*, 14*b* in the tube inserting direction R is such that their tube-inlet-side areas are situated above the torus of the loosely inserted connection tube. Thus, when the plug-in fork 2, is first inserted into the forward plug-through openings 6*a*, 6*b* in the plug-in fork inserting direction S, its two fork prongs 2*a*, 2*b* start to reach around the loosely inserted tube already behind the torus. For this purpose, the free prong ends of the plug-in fork 2 are introduced into the areas of the two forward plug-through openings 6*a*, 6*b* (situated on top in FIG. 1). This is automatically caused by the two inserting aids 11*a*, 11*b* disposed in front; for this purpose, the dimensions are selected so that the spacing of the areas of the forward plug-through openings 6*a*, 6*b* which are situated on top in FIG. 1 and are disposed above the wedge-shaped inserting aids 11*a*, 11*b*, corresponds approximately to the spacing of the free prong ends 2*a*, 2*b* of the plug-in fork. Therefore, for correct introduction into the connection piece 1 without jamming, the free prong ends of the plug-in fork 2 need only be placed onto the wedge-shaped inserting aids 11*a*, 11*b* disposed in front, and moved in the plug-in fork inserting direction S.

Subsequently, the forward prong area of the plug-in fork 2 starts to reach around the loosely inserted tube, and behind its torus, the prongs spreading open in a spring-elastic manner. The plug-in fork 2 is then advanced further until the free prong ends engage in the rearward plug-through openings 14*a*, 14*b* and abut there against their inserting bevels 15. Approximately in the same intermediate position of the plug-in fork, by means of their converging interior sides, the rearward circular-arc area of the it fork prongs 2*a*, 2*b* come to rest against the forward inserting bevels 9*a*, 9*b*.

If the plug-in fork 2 is now pressed farther in the plug-in fork inserting direction S, its forward prong ends move against the rearward inserting bevels 15 of the two rearward plug-through openings 14*a*, 14*b*. Simultaneously, its narrowing rearward fork prong area moves against the forward inserting bevels 9a, 9b, specifically against their stop surfaces inclined obliquely in the plug-in fork inserting direction S and against the plug-in fork contact edges 10a, 10b which extend with a component pointing in the tube inserting direction R into the direction of the separating web 8. As a result, it is forced to undergo a superimposed displacement in the tube inserting direction R. In this position the plug-in fork 2 narrows down at the level of the forward plug-through openings 6a, 6b. As a result, the wedge-shaped inserting aids 11a, 11b, which extend in a wedge shape with respect to the connection piece longitudinal center plane 7 and point in the tube inserting direction R, release this displacing movement of the plug-in fork 2 in the tube inserting direction R. Rather than acting in a blocking manner, they act additionally in a guiding manner.

Since the plug-in fork 2 passes behind the tube torus, its displacement in the direction R as noted above also takes along the tube, which so far had been placed only loosely in the connection piece 1, in the tube inserting direction R. As a result, the tube reaches its sealed-off end position in the connection piece 1 only by the inserting movement of the plug-in fork 2, without requiring the mounting person to press the tube into this end position and hold it there during the insertion of the plug-in fork. On the contrary, after it is loosely inserted into the connection piece 1, the tube can be released, or held in a loose joined position, without any pressing force acting in the tube inserting direction, until the plug-in fork 2 has reached around the tube torus.

When the free prong ends have then passed the exterior mouth of the rearward plug-through openings 14a, 14b, the separating web 8 of the forward connection piece side wall 3a will then be situated at the inlet area of the plug-in fork clamping gap 2d. Prior to that, until reaching this position, the plug-in fork 2 has travelled by means of the narrowing interior-side circular-arc section along the plug-in fork contact edges 10a, 10b of the inserting bevels 9a, 9b, until reaching the separating web 8 and, in the process, has experienced the displacement in the tube inserting direction R so that it is now situated directly below the inserting bevel 9a, 9b. From this intermediate position, the plug-in fork can now be inserted completely, experiencing no further movement in the tube inserting direction R. As a result, the separating web 8 enters the clamping gap 2d of the plug-in fork, and the circular-arc section of the plug-in fork 2 reaches around the inserted tube, while springing back into its essentially unspread position.

By taking along the tube in the tube inserting direction R, the O-shaped sealing ring was pressed into its seat 5, in which case it exercises a rubber-elastic counterforce by means of which the mounted tube presses with its toroidal flange against the surrounding plug-in fork 2. As a result, the tube is held in a prestressed and play-free manner in the connection piece 1, and is secured against outward movement by means of the plug-in fork 2.

Like the mounting, removal of the tube also presents no problems. For this purpose, the plug-in fork need only be gripped on its grip end 2c projecting from the connection piece 1 and pulled out against the plug-in fork inserting direction S. As it is pulled out, the widening circular arc section of the plug-in fork 2 arrives in the area of the wedge-shaped inserting aids 11a, 11b and slides along their bevel surface, whereby it is pushed slightly against the tube inserting direction R. This slight lifting movement of the plug-in fork 2 against the tube inserting direction R is initially also promoted by the elastic counterforce of the O-shaped ring seal. Since this pressure relief by the slight lifting of the plug-in fork against the tube inserting direction R occurs after only a relatively short unplugging path, the plug-in fork 2 can then be pulled completely out of the connection piece in a entirely pressure-relieved manner. Then the tube can be taken out of the connection piece 1.

It is understood that, depending on the application, instead of the illustrated plug-in fork, plug-in forks of a different construction can be used for implementing the tube connection coupling according to the invention. For this purpose, the dimensions of the different plug-through openings to be provided on the connection piece and of the inserting bevels assigned to them need only be adapted to the construction of the used plug-in fork such that the same mounting operation is implemented as described in the above-mentioned example, this mounting operation containing in particular the automatic forced displacement of the plug-in fork in the tube inserting direction during its inserting movement for the purpose of taking along the tube loosely inserted in the connection piece into its mounted end position.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Tube connection coupling for connecting to a connection tube which has a toroidal flange for securing the tube in the connection coupling, said connection coupling comprising:

a connection piece having side walls which define a recess for coupling with an end area of the connection tube that is insertable into the recess in a tube inserting direction parallel to an axial direction of the connection piece;

a plug-in fork having prongs which are releasably insertable into the connection piece in a plug-in fork inserting direction, for securing the end area of an inserted tube against movement in a direction opposite the tube inserting direction, with the toroidal flange engaging with and being held by the plug-in fork;

at least first and second pairs of plug-through openings provided on opposite side walls of the connection piece and situated facing one another in a spaced manner in the plug-in fork inserting direction, into which openings respective prongs of the plug-in fork are insertable; and inserting bevels formed in at least one portion of the plug-through openings, which inserting bevels have contact edges that abut with the prongs of the plug-in fork during insertion of the plug-in fork into the plug-through opening, said contact edges being inclined in a direction which cooperates with said prongs of said plug-in fork, to cause a forced movement of the plug-in fork in the tube inserting direction during a movement of the plug-in fork in the plug-in fork inserting direction.

2. Tube connection coupling according to claim 1, wherein the inserting bevels are formed in a forward portion of the plug-through openings, relative to the plug-in fork inserting direction;

said contact edges of the inserting bevels are disposed at an interior mouth edge and extend to the exterior mouth edge of the respective plug-through openings; and said inserting bevels extend diagonally, with a first surface normal component pointing in the tube inserting direction and a second surface normal component pointing in a direction which is transverse to the connection piece and perpendicular both to the first component and to the plug-in fork inserting direction; and a spacing apart of the inserting bevels in a direction, perpendicular to the plug-in fork inserting direction, decreases in a direction opposite the tube inserting direction, from a value which corresponds at least to a spacing of the plug-in fork prongs in the forward plug-in fork area, relative to the plug-in fork inserting direction, continuously to the value which corresponds approximately to a spacing of the plug-in fork prongs in the rearward plug-in fork area, relative to the plug-in fork inserting direction.

3. Tube connection coupling according to claim 2, wherein the inserting bevels of the plug-through openings which are disposed forwardly, relative to the plug-in fork inserting direction, have a stop surface for stopping movement of the plug-in fork in the plug-in fork inserting direction, which stop surface is forward in the plug-in fork inserting direction and is sloped at least in the plug-in fork inserting direction.

4. Tube connection coupling according to claim 2, wherein inserting aids are formed in the plug-through openings that are forwardly disposed relative to the plug-in fork inserting direction, which inserting aids open up the forwardly disposed plug-through openings with a spacing corresponding to spacing of the plug-in fork prongs in the plug-in fork in an area which is forwardly disposed in the inserting direction of the tube.

5. Tube connection coupling according to claim 2, wherein edges of the two plug-through openings that are rearwardly disposed relative to the plug-in fork inserting direction, comprise inserting bevels that extend in the plug-in fork inserting direction and have a surface normal component pointing in the tube inserting direction.

6. A coupling device for connecting to a connection tube having a toroidal flange at an end thereof, said coupling device comprising:

a connection piece having an aperture into which the end of the connection tube is insertable in a tube inserting direction parallel to an axial direction of the connection piece;

a plug-in fork having prongs which are releasably insertable in a plug-in fork inserting direction, into respective plug-through openings arranged in pairs on opposing side walls of the connection piece and spaced apart, so that an inserted plug-in fork bears against the toroidal flange of the tube, securing it against movement in a direction opposite the tube inserting direction; and inserting bevels disposed in at least one portion of the plug-through openings, which inserting bevels are adapted to bear against the prongs of a plug-in fork inserted into said plug-through openings, and are inclined relative to both the tube inserting direction and to a direction transverse to the plug-through openings so that they cause a forced movement of a plug-in fork in the tube inserting direction during insertion thereof in the plug-in fork inserting direction.

7. Tube connection coupling for connecting to a connection tube which has a toroidal flange for securing the tube in the connection coupling, said connection coupling comprising:

a connection piece having side walls which define a recess for coupling with an end area of the connection tube that is insertable into the recess in a tube inserting direction parallel to an axial direction of the connection piece;

a plug-in fork having prongs which are releasably insertable into the connection piece in a plug-in fork inserting direction, for securing the end area of an inserted tube against movement in a direction opposite the tube inserting direction, with the toroidal flange engaging with and being held by the plug-in fork;

at least first and second pairs of plug-through openings provided on opposite side walls of the connection piece and situated facing one another in a spaced manner in the plug-in fork inserting direction, into which openings respective prongs of the plug-in fork are insertable; and beveled inserting means formed in at least one portion of the plug-through openings, for exerting a forced movement of the plug-in fork in the tube inserting direction during a movement of the plug-in fork in the plug-in fork inserting direction.

8. Tube connection coupling for connecting to a connection tube which has a toroidal flange for securing the tube in the connection coupling, said connection coupling comprising:

a connection piece having side walls which define a recess for coupling with an end area of the connection tube that is insertable into the recess in a tube inserting direction parallel to an axial direction of the connection piece;

a plug-in fork having prongs which are releasably insertable into the connection piece in a plug-in fork inserting direction, for securing the end area of an inserted tube against movement in a direction opposite the tube inserting direction, with the toroidal flange engaging with and being held by the plug-in fork; and at least first and second pairs of plug-through openings provided on opposite side walls of the connection piece and situated facing one another in a spaced manner in the plug-in fork inserting direction, into which openings respective prongs of the plug-in fork are insertable;

wherein a forwardly disposed portion, relative to the fork inserting direction, of each opening in the first pair of through openings has an elongated cross sectional configuration, each such cross sectional configuration being disposed diagonally relative to the other cross sectional configuration, with first ends of said cross sectional configurations being relatively more widely spaced apart and second ends being more closely spaced, and said second first ends being disposed forwardly of said first second ends in the tube inserting direction.

9. Tube connection coupling according to claim 8, wherein said plug-in fork comprises prongs forming an open end portion for insertion into said first pair of through openings and thence into said second pair of through openings, a relatively wider central portion for engaging the toroidal flange in a fully inserted position of the plug-in fork and a relatively narrower portion at an end opposite the open end.

10. A tube connection coupling for connecting to a tube which has an end area with a toroidal flange, for engaging with a two prong plug-in fork which has an open end portion, a relatively wider central portion, and a relatively narrower end portion opposite said open end portion, for holding said tube against movement in a direction opposite an inserting direction of said tube into said coupling, comprising:

a connection piece having side walls which define a recess for coupling with said end area of said tube having the toroidal flange, when said end area is inserted into said recess in the inserting direction of said tube; and first and second pairs of substantially parallel fork insertion bores penetrating opposite walls of said recess;

wherein a first pair of said parallel fork insertion bores have openings with an elongate cross section at an external end portion thereof for insertion of the prongs of said plug-in fork, said openings being relatively more widely spaced apart at first ends thereof and relatively more narrowly spaced at second ends thereof, said second first ends being disposed forwardly of said first second ends relative to said tube inserting direction, whereby insertion of said fork through said insertion bores causes a movement of said fork in the tube inserting direction when the narrower end portion advances into said openings.

* * * * *